US012725750B2

(12) United States Patent
Titensor

(10) Patent No.: US 12,725,750 B2
(45) Date of Patent: Sep. 1, 2026

(54) VISUAL SAFE INDICATOR FOR INTERRUPTION OF POWER TO FUZE SYSTEMS AND METHODS

(71) Applicant: FLIR Unmanned Aerial Systems ULC, Vancouver (CA)

(72) Inventor: Matthew Titensor, Orem, UT (US)

(73) Assignee: FLIR Unmanned Aerial Systems ULC, Vancouver (CA)

( * ) Notice: Subject to any disclaimer, the term of this patent is extended or adjusted under 35 U.S.C. 154(b) by 316 days.

(21) Appl. No.: 18/632,173

(22) Filed: Apr. 10, 2024

(65) Prior Publication Data

US 2024/0347305 A1 Oct. 17, 2024

Related U.S. Application Data

(60) Provisional application No. 63/495,529, filed on Apr. 11, 2023.

(51) Int. Cl.
*H01H 85/30* (2006.01)
*H01H 9/10* (2006.01)
*H01H 85/055* (2006.01)

(52) U.S. Cl.
CPC ............ *H01H 85/30* (2013.01); *H01H 9/104* (2013.01); *H01H 85/055* (2013.01)

(58) Field of Classification Search
CPC ....... H01H 85/30; H01H 9/104; H01H 85/055
See application file for complete search history.

(56) References Cited

U.S. PATENT DOCUMENTS 3,795,101 A * 3/1974 Niznik .................... G04C 1/06 368/149
6,144,002 A * 11/2000 Coudert .................. H01H 3/30 200/400
6,614,336 B2 * 9/2003 Galli ...................... H01H 36/00 335/206
7,188,957 B2 * 3/2007 Beasley ................. G03B 21/14 348/743
8,253,517 B2 * 8/2012 Weber ................ H01H 71/1009 335/169
11,307,010 B2 4/2022 Hucker

* cited by examiner

*Primary Examiner* — John A Tweel, Jr.
(74) *Attorney, Agent, or Firm* — Haynes and Boone, LLP

(57) ABSTRACT

Systems and methods directed to a visual safe indicator (VSI) for mechanical interruption of power to a fuze are provided. A VSI includes a circuit board including a pair of contact pads, a shaft configured to rotate about an axis, a visual indicator wheel coupled to rotate with the shaft, and a pair of spring contacts coupled to the visual indicator wheel, or any combination thereof. Rotation of the shaft rotates the visual indicator wheel to move the pair of spring contacts between connected and disconnected positions associated with powered-on and powered-off states of the VSI. The connected position engages the pair of spring contacts with the pair of contact pads to complete a circuit through the VSI. The disconnected position disengages the pair of spring contacts from the pair of contact pads to open the circuit. Additional systems and related methods are also provided.

20 Claims, 10 Drawing Sheets

VISUAL SAFE INDICATOR FOR INTERRUPTION OF POWER TO FUZE SYSTEMS AND METHODS

CROSS REFERENCE TO RELATED APPLICATIONS

This application claims priority to and the benefit of U.S. Provisional Patent Application No. 63/495,529 filed Apr. 11, 2023 and entitled "VISUAL SAFE INDICATOR FOR INTERRUPTION OF POWER TO FUZE SYSTEMS AND METHODS," which is incorporated herein by reference in its entirety.

TECHNICAL FIELD

One or more embodiments relate generally to munitions and ordnance systems and more particularly, for example, to a visual safe indicator for interruption of power to a fuze.

BACKGROUND

Modern munitions and ordnance systems use electronic fuze systems for arming, making safe, and detonating warheads. These fuzes require several safety mechanisms to be certified for safe use by personnel. One such safety mechanism is a hardware power interrupt and visual indication of the state of the interrupt. This physically disconnects power from the trigger portion of the fuze, making it impossible to detonate the warhead. Commonly, an external facing red or green surface indicates a powered on or powered off state, respectively, and are commonly referred to as a visual safe indicator (VSI). Some VSI systems may be undesirable due to a variety of factors.

Therefore, there is a need in the art for systems and methods that address the deficiencies noted above, other deficiencies known in the industry, or at least offers an alternative to current techniques.

SUMMARY

In one or more embodiments, a visual safe indicator (VSI) is provided. The VSI includes a circuit board including a pair of contact pads, a shaft configured to rotate about an axis, a visual indicator wheel coupled to rotate with the shaft, and a pair of spring contacts coupled to the visual indicator wheel, or any combination thereof. Rotation of the shaft rotates the visual indicator wheel to move the pair of spring contacts between connected and disconnected positions associated with powered-on and powered-off states of the VSI. The connected position engages the pair of spring contacts with the pair of contact pads to complete a circuit through the VSI. The disconnected position disengages the pair of spring contacts from the pair of contact pads to open the circuit.

In one or more embodiments, a system is provided. The system includes an unmanned aerial vehicle (UAV) and a VSI integrated into the UAV. The VSI includes a circuit board including a pair of contact pads, a shaft configured to rotate about an axis, a visual indicator wheel coupled to rotate with the shaft, and a pair of spring contacts coupled to the visual indicator wheel, or any combination thereof. Rotation of the shaft rotates the visual indicator wheel to move the pair of spring contacts between connected and disconnected positions associated with powered-on and powered-off states of the VSI. The connected position engages the pair of spring contacts with the pair of contact pads to complete a circuit through the VSI. The disconnected position disengages the pair of spring contacts from the pair of contact pads to open the circuit.

In one or more embodiments, a method is provided. The method includes rotating, by a bistable rotary solenoid of a VSI, a shaft and visual indicator wheel to move a pair of spring contacts between connected and disconnected positions associated with powered-on and powered-off states of the VSI, wherein the spring contacts are coupled to the visual indicator wheel. The method further includes engaging, in the connected position, the pair of spring contacts with a pair of contact pads of a circuit board to complete a circuit through the VSI. The method further includes disengaging, in the disconnected position, the pair of spring contacts from the pair of contact pads to open the circuit.

The scope of the present disclosure is defined by the claims, which are incorporated into this section by reference. A more complete understanding of embodiments of the present disclosure will be afforded to those skilled in the art, as well as a realization of additional advantages thereof, by a consideration of the following detailed description of one or more embodiments. Reference will be made to the appended sheets of drawings that will first be described briefly.

Figure 1:
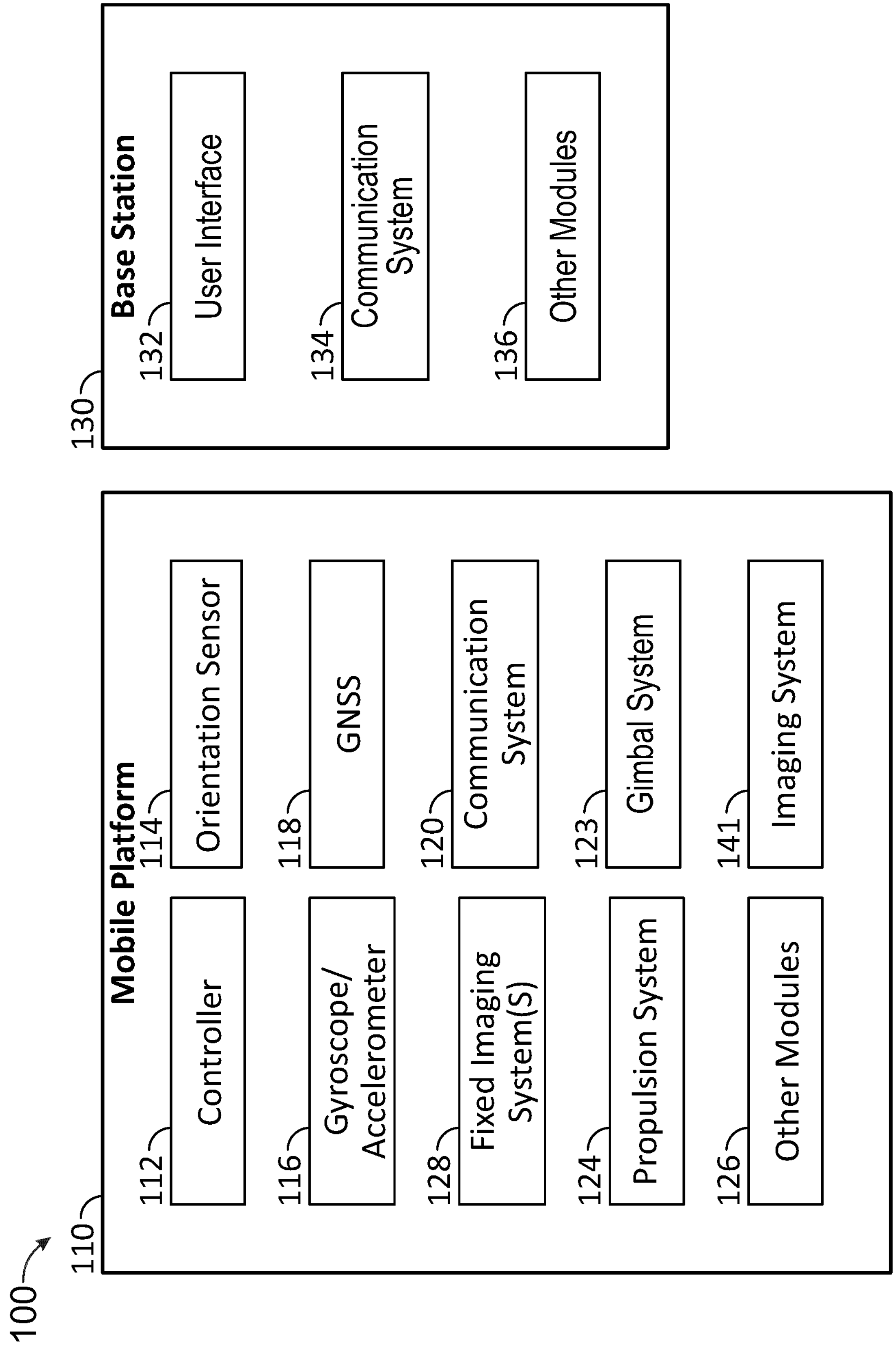
FIG. 1 illustrates a block diagram of a system, in accordance with an embodiment of the disclosure.

Embodiments of the present disclosure and their advantages are best understood by referring to the detailed description that follows. It is noted that sizes of various components and distances between these components are not drawn to scale in the figures. It should be appreciated that like reference numerals are used to identify like elements illustrated in one or more of the figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

FIG. 1 illustrates a block diagram of a system 100, in accordance with an embodiment of the disclosure. Referring to FIG. 1, system 100 includes a UAV 110 and a base station 130, in accordance with one or more embodiments of the disclosure. UAV 110 may be any pilotless aircraft, such as an airplane, helicopter, drone, or other machine capable of flight (e.g., a mobile platform). For example, UAV 110, which may be referred to as a drone or an unmanned aerial system (UAS), may be any pilotless aircraft for military missions, public services, agricultural application, and recreational video and photo capturing, without intent to limit. Depending on the application, UAV 110 may by piloted autonomously (e.g., via onboard computers) or via remote control. UAV 110 may include a fixed-wing, rotorcraft, or quadcopter design, although other configurations are contemplated. As a result, the term "UAV" or "drone" is characterized by function and not by shape or flight technology.

In various embodiments, UAV 110 may be configured to fly over a scene or survey area, to fly through a structure, or to approach a target and image or sense the scene, structure, or target, or portions thereof, via an imaging system 141 (e.g., using a gimbal system 123 to aim imaging system 141 at the scene, structure, or target, or portions thereof, for example). Resulting imagery and/or other sensor data may be processed (e.g., by controller 112) and displayed to a user through use of user interface 132 (e.g., one or more displays such as a multi-function display (MFD), a portable electronic device such as a tablet, laptop, or smart phone, or other appropriate interface) and/or stored in memory for later viewing and/or analysis. In some embodiments, system 100 may be configured to use such imagery and/or sensor data to control operation of UAV 110 and/or imaging system 141, such as controlling gimbal system 123 to aim imaging system 141 towards a particular direction, or controlling propulsion system 124 to move UAV 110 to a desired position in a scene or structure or relative to a target.

UAV 110 may be implemented as a mobile platform configured to move or fly and position and/or aim imaging system 141 (e.g., relative to a selected, designated, or detected target). As shown in FIG. 1, UAV 110 may include one or more of a controller 112, an orientation sensor 114, a gyroscope/accelerometer 116, a global navigation satellite system (GNSS) 118, a communication system 120, a gimbal system 123, a propulsion system 124, and other modules 126. Operation of UAV 110 may be substantially autonomous and/or partially or completely controlled by base station 130, which may include one or more of a user interface 132, a communication system 134, and other modules 136. In other embodiments, UAV 110 may include one or more of the elements of base station 130, such as with various types of manned aircraft, terrestrial vehicles, and/or surface or subsurface watercraft. Imaging system 141 may be physically coupled to UAV 110 via gimbal system 123 and may be configured to capture sensor data (e.g., visible spectrum images, infrared images, narrow aperture radar data, and/or other sensor data) of a target position, area, and/or object(s) as selected and/or framed by operation of UAV 110 and/or base station 130.

Controller 112 may be implemented as any appropriate logic circuit and/or device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of system 100, such as gimbal system 123, imaging system 141, fixed imaging systems 128, or the propulsion system 124, for example. Such software instructions may also implement methods for processing infrared images and/or other sensor signals, determining sensor information, providing user feedback (e.g., through user interface 132), querying devices for operational parameters, selecting operational parameters for devices, or performing any of the various operations described herein.

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of system 100. For example, controller 112 may be adapted to store sensor signals, sensor information, parameters for coordinate frame transformations, calibration parameters, sets of calibration points, and/or other operational parameters, over time, for example, and provide such stored data to a user using user interface 132. In some embodiments, controller 112 may be integrated with one or more other elements of UAV 110 such as gimbal system 123, imaging system 141, and fixed imaging system(s) 128, for example.

In some embodiments, controller 112 may be configured to substantially continuously monitor and/or store the status of and/or sensor data provided by one or more elements of UAV 110, gimbal system 123, imaging system 141, fixed imaging system(s) 128, and/or base station 130, such as the position and/or orientation of UAV 110, gimbal system 123, imaging system 141, and/or base station 130, for example.

Orientation sensor 114 may be implemented as one or more of a compass, float, accelerometer, and/or other device capable of measuring an orientation of UAV 110 (e.g., magnitude and direction of roll, pitch, and/or yaw, relative to one or more reference orientations such as gravity and/or Magnetic North), gimbal system 123, fixed imaging system (s) 128, and/or other elements of system 100, and providing such measurements as sensor signals and/or data that may be communicated to various devices of system 100.

Gyroscope/accelerometer 116 may be implemented as one or more inertial measurement units (IMUs), electronic sextants, semiconductor devices, integrated chips, accelerometer sensors, accelerometer sensor systems, or other devices capable of measuring angular velocities/accelerations and/or linear accelerations (e.g., direction and magnitude) of UAV 110 and/or other elements of system 100 and providing such measurements as sensor signals and/or data that may be communicated to other devices of system 100 (e.g., user interface 132, controller 112).

GNSS 118 may be implemented according to any global navigation satellite system, including a GPS, GLONASS, and/or Galileo based receiver and/or other device capable of determining absolute and/or relative position of UAV 110 (e.g., or an element of UAV 110) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 100 and other nodes participating in a mesh network. In some embodiments, GNSS 118 may include an altimeter, for example, or may be used to provide an absolute altitude.

Communication system 120 may be implemented as any wired and/or wireless communication system configured to transmit and receive analog and/or digital signals between elements of system 100 and other nodes participating in a mesh network. For example, communication system 120 may be configured to receive flight control signals and/or data from base station 130 and provide them to controller 112 and/or propulsion system 124. In other embodiments, communication system 120 may be configured to receive images and/or other sensor information (e.g., visible spectrum and/or infrared still images or video images) from fixed imaging system(s) 128 and/or imaging system 141 and relay the sensor data to controller 112 and/or base station 130. In some embodiments, communication system 120 may be configured to support spread spectrum transmissions, for example, and/or multiple simultaneous communications channels between elements of system 100. Wireless communication links may include one or more analog and/or digital radio communication links, such as WiFi and others, as described herein, and may be direct communication links established between elements of system 100, for example, or may be relayed through one or more wireless relay stations configured to receive and retransmit wireless communications. Communication links established by communication system 120 may be configured to transmit data between elements of system 100 substantially continuously throughout operation of system 100, where such data includes various types of sensor data, control parameters, and/or other data, as described herein.

Gimbal system 123 may be implemented as an actuated gimbal mount, for example, that may be controlled by controller 112 to stabilize and direct imaging system 141 relative to a target or to aim imaging system 141 according to a desired direction and/or relative orientation or position. For example, controller 112 may receive a control signal from one or more components of system 100 to cause gimbal system 123 to adjust a position of imaging system 141 as described in the disclosure. As such, gimbal system 123 may be configured to provide a relative orientation of imaging system 141 (e.g., relative to an orientation of UAV 110) to controller 112 and/or communication system 120 (e.g., gimbal system 123 may include its own orientation sensor 114). In other embodiments, gimbal system 123 may be implemented as a gravity driven mount (e.g., non-actuated). In various embodiments, gimbal system 123 may be configured to provide power, support wired communications, and/or otherwise facilitate operation of articulated sensor/imaging system 141. In further embodiments, gimbal system 123 may be configured to couple to a laser pointer, range finder, and/or other device, for example, to support, stabilize, power, and/or aim multiple devices (e.g., imaging system 141 and one or more other devices) substantially simultaneously.

In some embodiments, gimbal system 123 may be adapted to rotate imaging system 141+−90 degrees, or up to 360 degrees, in a vertical plane relative to an orientation and/or position of UAV 110. In further embodiments, gimbal system 123 may rotate imaging system 141 to be parallel to a longitudinal axis or a lateral axis of UAV 110 as UAV 110 yaws, which may provide 360 degree ranging and/or imaging in a horizontal plane relative to UAV 110. In various embodiments, controller 112 may be configured to monitor an orientation of gimbal system 123 and/or imaging system 141 relative to UAV 110, for example, or an absolute or relative orientation of an element of imaging system 141 (e.g., a sensor of imaging system 141). Such orientation data may be transmitted to other elements of system 100 for monitoring, storage, or further processing, as described herein.

Propulsion system 124 may be implemented as one or more propellers, turbines, or other thrust-based propulsion systems, and/or other types of propulsion systems that can be used to provide motive force and/or lift to UAV 110 and/or to steer UAV 110. In some embodiments, propulsion system 124 may include multiple propellers (e.g., a tri, quad, hex, oct, or other type “copter”) that can be controlled (e.g., by controller 112) to provide lift and motion for UAV 110 and to provide an orientation for UAV 110. In other embodiments, propulsion system 124 may be configured primarily to provide thrust while other structures of UAV 110 provide lift, such as in a fixed wing embodiment (e.g., where wings provide the lift) and/or an aerostat embodiment (e.g., balloons, airships, hybrid aerostats). In various embodiments, propulsion system 124 may be implemented with a portable power supply, such as a battery and/or a combustion engine/generator and fuel supply.

Fixed imaging system(s) 128 may be implemented as an imaging device fixed to the body of UAV 110 such that a position and orientation is fixed relative to the body of the mobile platform, according in various embodiments. Fixed imaging system(s) 128 may include one or more imaging modules, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum detector elements that can be arranged in a focal plane array. In various embodiments, an imaging module of a fixed imaging system 128 may include one or more logic devices that can be configured to process imagery captured by detector elements of the imaging module before providing the imagery to controller 112. Fixed imaging system(s) 128 may be arranged on the UAV 110 and configured to perform any of the operations or methods described herein, at least in part, or in combination with controller 112 and/or user interface 132. An example fixed imaging system(s) 128 configuration includes using 6 fixed imaging systems, each covering a 90-degree sector to give complete 360-degree coverage. Using on-chip down-sampling of the images provided by fixed imaging system(s) 128 to approximately the order of 128×128 pixels and recording at 1200 Hz, the fixed imaging system(s) 128 can track rotations of 1000-1500 degrees per second with an optical flow of less than one pixel per frame. The same one-pixel optical flow per frame criteria would be fulfilled when flying UAV 110 at speeds in excess of 10 m/s at 1 m distance from the surface (e.g., wall, ground, roof, etc.). When not sampling at high rates, these low-resolution fixed imaging system(s) 128 may consume little power and thus minimally impact an average power consumption for UAV 110. Thus, a motion-dependent frame rate adjustment may be used to operate efficiently where the frame rate can be kept high enough to maintain the one pixel optical-flow per the frame tracking criteria.

Other modules 126 may include other and/or additional sensors, actuators, communications modules/nodes, and/or user interface devices, for example, and may be used to provide additional environmental information related to operation of UAV 110, for example. In some embodiments, other modules 126 may include a humidity sensor, a wind and/or water temperature sensor, a barometer, an altimeter, a radar system, a proximity sensor, a visible spectrum camera or infrared camera (with an additional mount), an irradiance detector, and/or other environmental sensors providing measurements and/or other sensor signals that can be displayed to a user and/or used by other devices of system 100 (e.g., controller 112) to provide operational control of UAV 110 and/or system 100.

In some embodiments, other modules 126 may include one or more actuated and/or articulated devices (e.g., multi-spectrum active illuminators, visible and/or IR cameras, radars, sonars, and/or other actuated devices) coupled to UAV 110, where each actuated device includes one or more actuators adapted to adjust an orientation of the device, relative to UAV 110, in response to one or more control signals (e.g., provided by controller 112). Other modules 126 may include a stereo vision system configured to provide image data that may be used to calculate or estimate a position of UAV 110, for example, or to calculate or estimate a relative position of a navigational hazard in proximity to UAV 110. In various embodiments, controller 112 may be configured to use such proximity and/or position information to help safely pilot UAV 110 and/or monitor communication link quality with the base station 130.

In some embodiments, other modules 126 may include one or more payloads coupled to UAV 110. For example, other modules 126 may include one or more munitions or ordnances, such as an aircraft ordnance (e.g., one or more missiles, bombs, or warheads), among other ordnance. In this manner, UAV 110 may be an unmanned combat aerial vehicle, such as a combat drone or battlefield drone.

User interface 132 of base station 130 may be implemented as one or more of a display, a touch screen, a keyboard, a mouse, a joystick, a knob, a steering wheel, a yoke, and/or any other device capable of accepting user input and/or providing feedback to a user. In various embodiments, user interface 132 may be adapted to provide user input (e.g., as a type of signal and/or sensor information transmitted by communication system 134 of base station 130) to other devices of system 100, such as controller 112. User interface 132 may also be implemented with one or more logic devices (e.g., similar to controller 112) that may be adapted to store and/or execute instructions, such as software instructions, implementing any of the various processes and/or methods described herein. For example, user interface 132 may be adapted to form communication links, transmit and/or receive communications (e.g., infrared images and/or other sensor signals, control signals, sensor information, user input, and/or other information), for example, or to perform various other processes and/or methods described herein.

In some embodiments, user interface 132 may be adapted to accept user input including a user-defined target heading, waypoint, route, and/or orientation for an element of system 100, for example, and to generate control signals to cause UAV 110 to move according to the target heading, route, and/or orientation, or to aim imaging system 141. In other embodiments, user interface 132 may be adapted to accept user input modifying a control loop parameter of controller 112, for example. In further embodiments, user interface 132 may be adapted to accept user input including a user-defined target attitude, orientation, and/or position for an actuated or articulated device (e.g., imaging system 141) associated with UAV 110, for example, and to generate control signals for adjusting an orientation and/or position of the actuated device according to the target altitude, orientation, and/or position. Such control signals may be transmitted to controller 112 (e.g., using communication system 134 and 120), which may then control UAV 110 accordingly.

Communication system 134 may be implemented as any wired and/or wireless communication system configured to transmit and receive analog and/or digital signals between elements of system 100 and/or nodes participating in a mesh network. For example, communication system 134 may be configured to transmit flight control signals or commands from user interface 132 to communication systems 120 or 144. In other embodiments, communication system 134 may be configured to receive sensor data (e.g., visible spectrum and/or infrared still images or video images, or other sensor data) from UAV 110. In some embodiments, communication system 134 may be configured to support spread spectrum transmissions, for example, and/or multiple simultaneous communications channels between elements of system 100. In various embodiments, communication system 134 may be configured to monitor the status of a communication link established between base station 130, UAV 110, and/or the nodes participating in the mesh network (e.g., including packet loss of transmitted and received data between elements of system 100 or the nodes of the mesh network, such as with digital communication links). Such status information may be provided to user interface 132, for example, or transmitted to other elements of system 100 for monitoring, storage, or further processing, as described herein.

Other modules 136 of base station 130 may include other and/or additional sensors, actuators, communications modules/nodes, and/or user interface devices used to provide additional environmental information associated with base station 130, for example. In some embodiments, other modules 136 may include a humidity sensor, a wind and/or water temperature sensor, a barometer, a radar system, a visible spectrum camera, an infrared camera, a GNSS, and/or other environmental sensors providing measurements and/or other sensor signals that can be displayed to a user and/or used by other devices of system 100 (e.g., controller 112) to provide operational control of UAV 110 and/or system 100 or to process sensor data to compensate for environmental conditions, such as an water content in the atmosphere approximately at the same altitude and/or within the same area as UAV 110 and/or base station 130, for example. In some embodiments, other modules 136 may include one or more actuated and/or articulated devices (e.g., multi-spectrum active illuminators, visible and/or IR cameras, radars, sonars, and/or other actuated devices), where each actuated device includes one or more actuators adapted to adjust an orientation of the device in response to one or more control signals (e.g., provided by user interface 132).

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 100. In addition, one or more non-transitory mediums may be provided for storing machine readable instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 100 using a variety of wired and/or wireless communication techniques, including voltage signaling, Ethernet, WiFi, Bluetooth, Zigbee, Xbee, Micronet, Cursor-on-Target (CoT) or other medium and/or short range wired and/or wireless networking protocols and/or implementations, for example. In such embodiments, each element of system 100 may include one or more modules supporting wired, wireless, and/or a combination of wired and wireless communication techniques. In some embodiments, various elements or portions of elements of system 100 may be integrated with each other, for example, or may be integrated onto a single printed circuit board (PCB) to reduce system complexity, manufacturing costs, power requirements, coordinate frame errors, and/or timing errors between the various sensor measurements. Each element of system 100 may include one or more batteries, capacitors, or other electrical power storage devices, for example, and may include one or more solar cell modules or other electrical power generating devices. In some embodiments, one or more of the devices may be powered by a power source for UAV 110, using one or more power leads. Such power leads may also be used to support one or more communication techniques between elements of system 100.

Figure 2A:
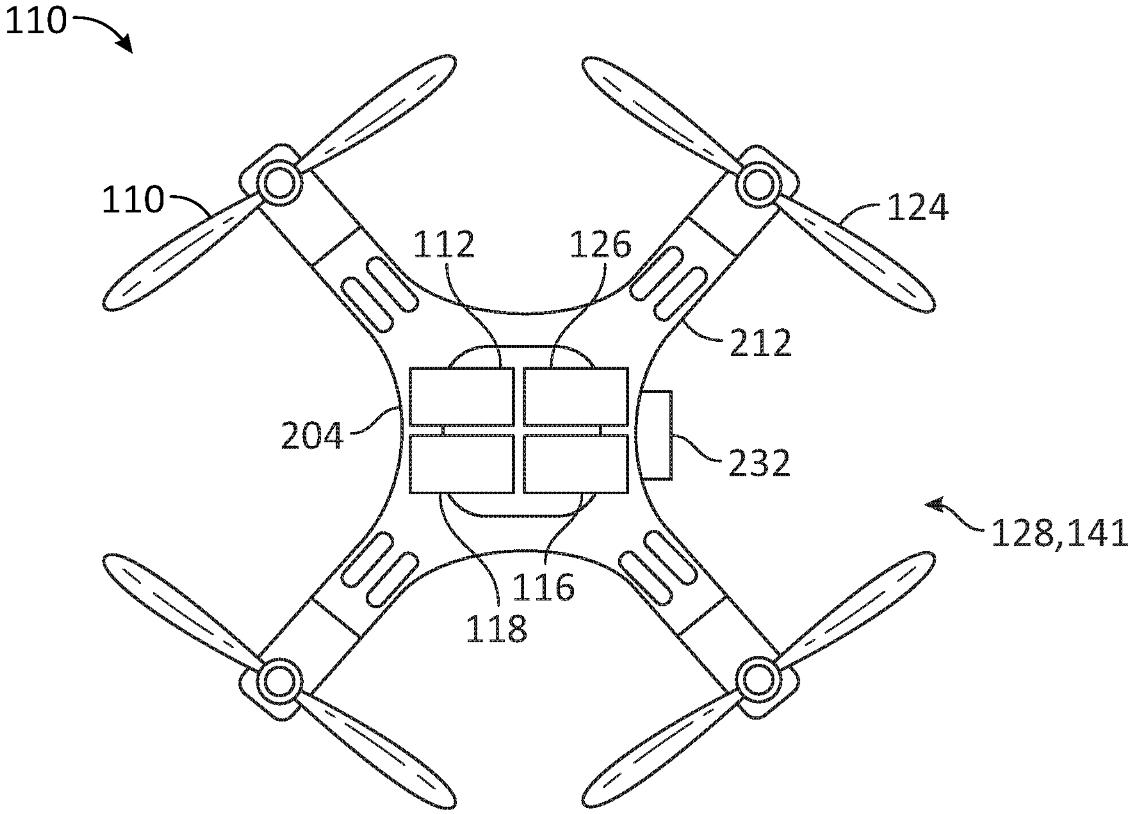
FIG. 2A illustrates a diagram of an unmanned aerial vehicle (UAV), in accordance with an embodiment of the disclosure.

FIG. 2A illustrates a diagram of UAV 110. Referring to FIG. 2A, UAV 110 may include a body 204 and propulsion system 124. Propulsion system 124 may be configured to propel UAV 110 for flight. For example, propulsion system 124 may include one or more propellers 210 connected to body 204, such as via respective arms or wings 212 extending from body 204. Depending on the application, propellers 210 may have a fixed orientation, or propellers 210 may move, to provide a desired flight characteristic. Operation of propulsion system 124 may be substantially autonomous and/or partially or completely controlled by a remote system (e.g., a remote control, a tablet, a smartphone, base station 130, etc.).

Body 204 may be equipped with controller 112 that may include one or more logic devices. Each logic device, which may be referred to as an on-board computer or processor, may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of UAV 110 and/or other elements of a system, for example. Such software instructions may implement methods for processing images and/or other sensor signals, determining sensor information, providing user feedback, querying devices for operational parameters, selecting operational parameters for devices, or performing any of the various operations described herein (e.g., operations performed by one or more devices of UAV 110).

In addition, a non-transitory medium may be provided for storing machine readable instructions for loading into and execution by controller 112. In these and other embodiments, controller 112 may be implemented with other components where appropriate, such as volatile memory, non-volatile memory, one or more interfaces, and/or various analog and/or digital components for interfacing with devices of UAV 110. For example, controller 112 may be adapted to store sensor signals, sensor information, and/or operational parameters, over time, for example, and provide such stored data to a user. In some embodiments, controller 112 may be integrated with one or more other elements of UAV 110, for example, or distributed as multiple logic devices within UAV 110.

Controller 112 may be configured to perform a set of operations. For example, controller 112 may be configured for flight control and position estimation, among other operations. For position estimation, UAV 110 may be equipped with GNSS 118 and/or gyroscope/accelerometer 116 to provide position measurements. For example, GNSS 118 and/or gyroscope/accelerometer 116 may provide frequent measurements to controller 112 for position estimation. In embodiments, controller 112 may be configured for video/image processing and communication. Specifically, controller 112 may process one or more images captured by one or more cameras of UAV 110, as described below. Although specific flight module and imagery module capabilities are described with reference to controller 112, respectively, the flight module and imagery module may be embodied as separate modules of a single logic device or performed collectively on multiple logic devices.

In embodiments, UAV 110 may include other modules, such as other and/or additional sensors, actuators, communications modules/nodes, and/or user interface devices used to provide additional operational and/or environmental information, for example. In some embodiments, other modules may include navigational or environmental sensors providing measurements and/or other sensor signals that can be displayed to a user and/or used to provide operational control of UAV 110, as described herein. In various embodiments, other modules may include a power supply implemented as any power storage device configured to provide enough power to each element of UAV 110 to keep all such elements active and operable.

Figure 2B:
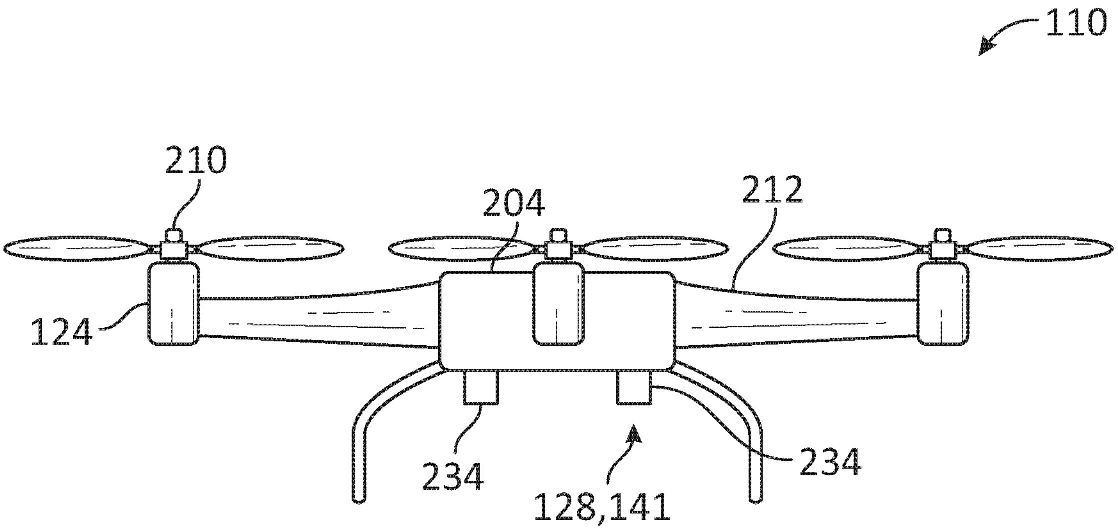
FIG. 2B illustrates another diagram of the UAV, in accordance with an embodiment of the disclosure.

FIG. 2B illustrates a diagram of a side view of UAV 110, in accordance with an embodiment of the disclosure. Referring to FIGS. 2A-2B, UAV 110 may include one or more cameras, such as several cameras (e.g., pointing in same or different directions). For example, fixed imaging system(s) 128 and/or imaging system 141 may include a front camera 232 pointing in the direction of travel. In embodiments, front camera 232 may be fixed or connected to gimbal system 123 to aim front camera 232 as desired. Referring to FIG. 2B, fixed imaging system(s) 128 and/or imaging system 141 may include one or more navigation cameras 234 pointing down and to the sides of body 204. Navigation cameras 234 may be fixed or connected to gimbal system 123 to aim navigation cameras 234 as desired. Navigation cameras 234 may support position estimation of UAV 110, such as when GPS data is inaccurate, GNSS 118 is inoperable or not functioning properly, etc. For example, images from navigation cameras 234 (and/or front camera 232) may be provided to controller 112 for analysis (e.g., position estimation).

Front camera 232 and/or navigation cameras 234 may be configured to capture one or more images (e.g., visible and/or non-visible images), such as a stream of images. For example, front camera 232 and/or navigation cameras 234 may be configured to capture visible, infrared, and/or thermal infrared images, among others. Each camera may include an array of sensors (e.g., a multi-sensor suite) for capturing thermal images (e.g., thermal image frames) in response to infrared radiation. In embodiments, front camera 232 and/or navigation cameras 234 may capture short-wave infrared (SWIR) light (e.g., 1-2 μm wavelengths), mid-wave infrared (MWIR) light (e.g., 3-5 μm wavelengths), and/or long-wave infrared (LWIR) light (e.g., 8-15 μm wavelengths). In embodiments, front camera 232 and/or navigation cameras 234 may capture visible and infrared fused images. For instance, both a visible and a thermal representation of a scene (e.g., a search area) may be captured and/or presented to the pilot or another user of the system.

Figure 3:
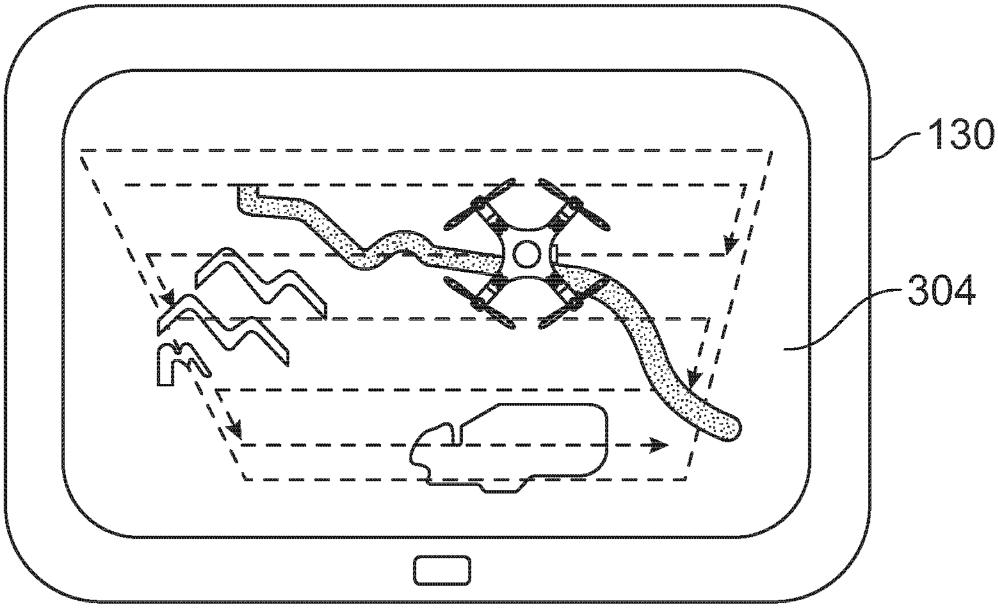
FIG. 3 illustrates a diagram of a base station or controller, in accordance with an embodiment of the disclosure.

FIG. 3 illustrates a diagram of base station 130, in accordance with an embodiment of the disclosure. Base station 130 may be implemented as one or more of a tablet, a display, a touch screen, a keyboard, a mouse, a joystick, a knob, a steering wheel, and/or any other device capable of accepting user input and/or providing feedback to a user. In various embodiments, base station 130 may provide a user interface 304 (e.g., a graphical user interface) adapted to receive user input. Base station 130 may be implemented with one or more logic devices that may be adapted to store and/or execute instructions, such as software instructions, implementing any of the various processes and/or methods described herein. For example, base station 130 may be adapted to form communication links, transmit and/or receive communications (e.g., sensor signals, control signals, sensor information, user input, and/or other information), for example, or to perform various other processes and/or methods described herein The pilot may have control of UAV 110 and access to UAV data using base station 130. For example, base station 130 may be connected to UAV 110 using a wireless link, such as a wireless link having enough bandwidth for video and data transmission. Base station 130 may include an image panel and an input panel. In embodiments, user interface 304 may function as both the image panel and the input panel. The image panel may be used to view image/video feeds from one or more cameras on-board UAV 110, such as front camera 232 and/or navigation cameras 234. The input panel may be configured to receive user input, such as via the user's finger, a stylus, etc. For example, input panel may allow the pilot to configure different UAV and/or search settings. In embodiments, base station 130 may provide a map for the pilot to locate UAV 110 during flight. In some embodiments, one or more accessories may be connected to the base station 130, such as a joystick for better flight control of UAV 110. As shown, the base station 130 may be a tablet, although other configurations are contemplated.

Figure 4:
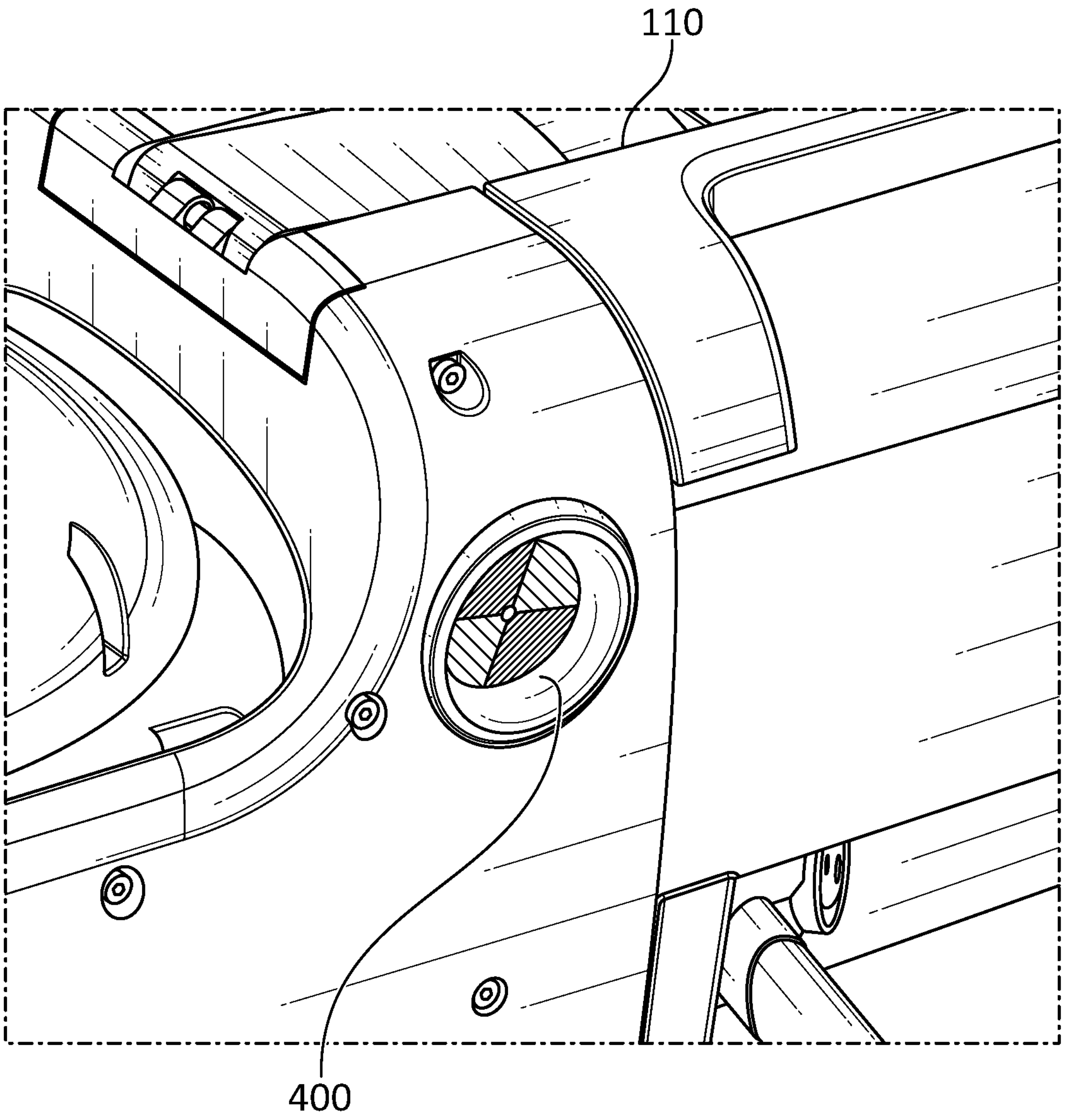
FIG. 4 illustrates a diagram of a UAV including a visual safe indicator (VSI), in accordance with an embodiment of the disclosure.

FIG. 4 illustrates a diagram of a UAV including a visual safe indicator (VSI) 400, in accordance with an embodiment of the disclosure. As noted above, UAV 110 may be part of a munitions or ordnance system to carry aircraft ordnance, such as missiles, bombs, or warheads, among other aircraft ordnance. In such embodiments, UAV 110 may include VSI 400 as a safety mechanism for ground personnel (e.g., for assembly, maintenance, and/or drone recovery operations to verify UAV 110 is not armed). As described herein, VSI 400 may provide a hardware power interrupt and visual indication of the state of the interrupt. For example, VSI 400 may physically disconnect power from a trigger portion of a fuzing system, making it impossible to detonate an associated aircraft ordnance. When the aircraft ordnance is armed, VSI 400 may physically connect power from the trigger system. In this manner, VSI 400 operates as a physical switch (i.e., hardware interrupt in the form of physical contacts) in arming the aircraft ordnance/UAV 110, as detailed below. To maintain legacy control and signals, VSI 400 may be backwards compatible with existing fuze hardware.

Figure 5:
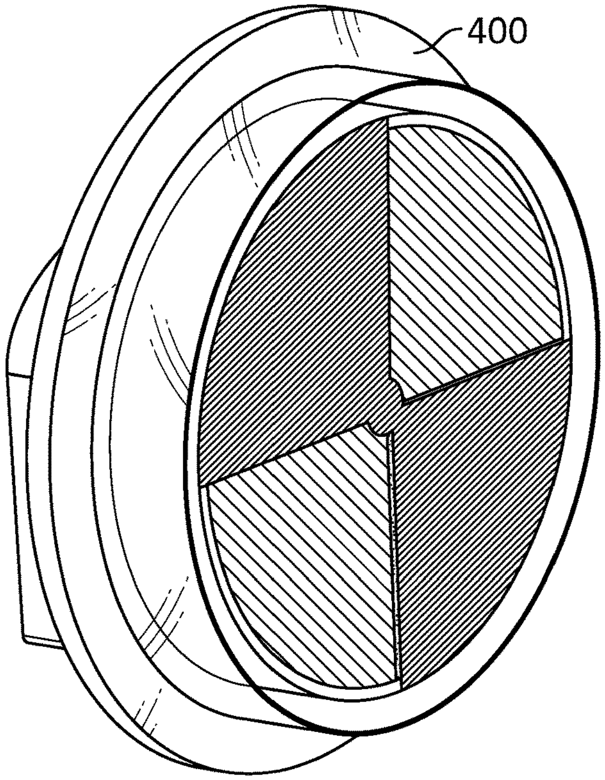
FIG. 5 illustrates a diagram of a VSI in a powered-off state, in accordance with an embodiment of the disclosure.
Figure 6:
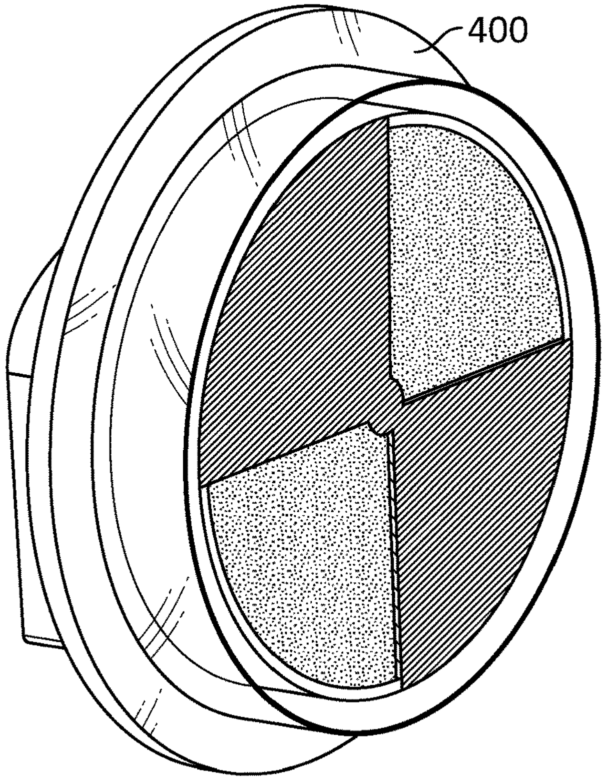
FIG. 6 illustrates a diagram of a VSI in a powered-on state, in accordance with an embodiment of the disclosure.

FIG. 5 illustrates a diagram of VSI 400 in a powered-off state, in accordance with an embodiment of the disclosure. FIG. 6 illustrates a diagram of VSI 400 in a powered-on state, in accordance with an embodiment of the disclosure. Referring to FIGS. 5-6, VSI 400 may provide visual indication of the armed state of UAV 110. For example, VSI 400 may provide one of two distinct patterns or colors for viewing by a user. Referring to FIG. 5, VSI 400 may provide a first color or pattern (e.g., a green color/pattern) when VSI 400 is in a powered-off state, such as to visually indicate to ground personnel that UAV 110 is disarmed and safe to approach or work on. Referring to FIG. 6, VSI 400 may provide a second color or pattern (e.g., a red color/pattern) when VSI 400 is in a powered-on state, such as to visually indicate to ground personnel that UAV 100 is armed and unsafe to approach or work on. As detailed below, VSI 400 may include a rotary wheel containing both patterns, the wheel sitting behind a cover with correspondingly painted opaque patterns. In such embodiments, the wheel rotates 90° to display the first or second color/pattern (e.g., red or green states).

Figure 7:
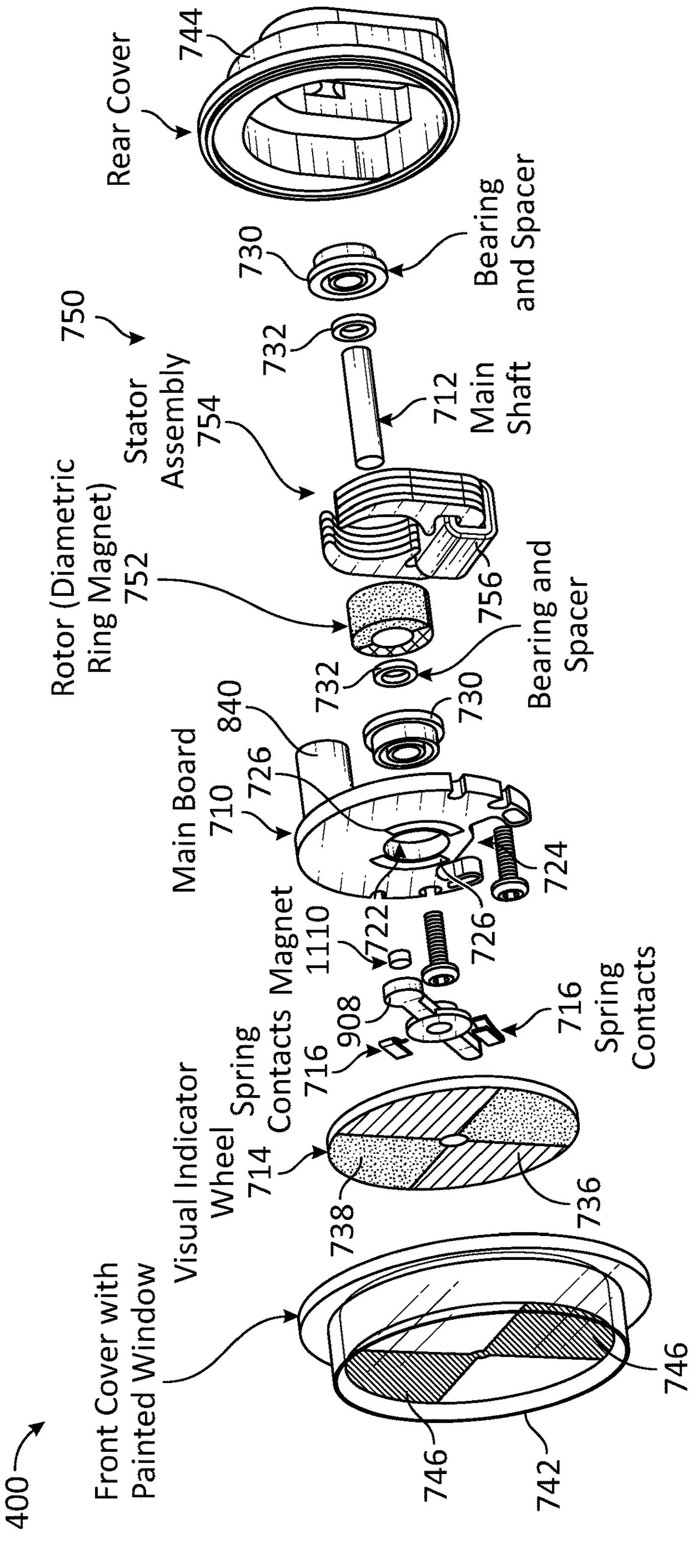
FIG. 7 illustrates an exploded view of a VSI, in accordance with an embodiment of the disclosure.

FIG. 7 illustrates an exploded view of VSI 400, in accordance with an embodiment of the disclosure. As shown, VSI 400 includes a circuit board 710, a shaft 712, a visual indicator wheel 714, and a pair of spring contacts 716, or any combination thereof, among other components. Circuit board 710 may include a thru hole 722, a cutout 724, and a pair of contact pads 726. Contact pads 726 may be positioned about thru hole 722, such as diametrically opposed across thru hole 722. Contact pads 726 may be connected to respective electrical connections of VSI 400 as part of a hardware switch.

Shaft 712 may extend at least partially through thru hole 722 to rotate about an axis. For example, a pair of rotatory bearings 730 may rotatably support shaft 712 within VSI 400. In embodiments, one or more spacers 732 may be coupled to shaft 712 to position additional components on shaft 712, such as a rotor, described below.

Visual indicator wheel 714 (hereinafter "wheel" for sake of simplicity without intent to limit) may be coupled to rotate with shaft 712. For instance, wheel 714 may be fixed to shaft 712, although other configurations are contemplated. As shown, wheel 714 includes alternating first and second patterns 736, 738. First pattern 736 may be associated with the powered-off state of VSI 400, and second pattern 738 may be associated with the powered-on state of VSI 400. In embodiments, wheel 714 may be or include a circuit board itself. For instance, wheel 714 may provide a trace between spring contacts 716.

Spring contacts 716 may be coupled to wheel 714, such that rotation of wheel 714 moves spring contacts 716. For example, spring contacts 716 may be soldered or otherwise attached to wheel 714 (e.g., to the rear of wheel 714) and positioned at least partially between wheel 714 and circuit board 710. Spring contacts 716 may selectively engage contact pads 726 of circuit board 710. For instance, rotation of shaft 712 may rotate wheel 714 to move spring contacts 716 between connected and disconnected positions associated with the powered-on and powered-off states of VSI 400. The connected position may engage spring contacts 716 with contact pads 726 of circuit board 710 to complete a circuit through VSI 400, as described below. The disconnected position may disengage spring contacts 716 from contact pads 726 to open the circuit.

With continued reference to FIG. 7, VSI 400 may include other components. For example, VSI 400 may include a front cover 742 and a rear cover 744. Front cover 742 may include painted or otherwise opaque windows 746 to cover one of the first pattern 736 or the second pattern 738 based on position of wheel 714. For instance, a first position of wheel 714 may position second pattern 738 behind windows 746, such that only first pattern 736 is visible through front cover 742. Alternatively, a second position of wheel 714 may position first pattern 736 behind window, such that only second pattern 738 is visible through front cover 742. Front cover 742 may be sealed to rear cover 744, such as to create a robust sealed assembly and keep manufacturing and assembly simple. In embodiments, rotatory bearings 730 are fully aligned and retained by rear cover 744 and circuit board 710.

In embodiments, VSI 400 includes a bistable rotary solenoid 750 to rotate shaft 712 between the connected and disconnected positions. Bistable rotary solenoid 750 may include multiple elements to rotate shaft 712 in either direction and hold in either end position with no power applied, as described more fully below. For example, bistable rotary solenoid 750 may include a rotor 752, a stator 754, and an electromagnet coil 756. It is noted that the term “bistable rotary solenoid” is characterized by function and not by specific structure or form.

Figure 8:
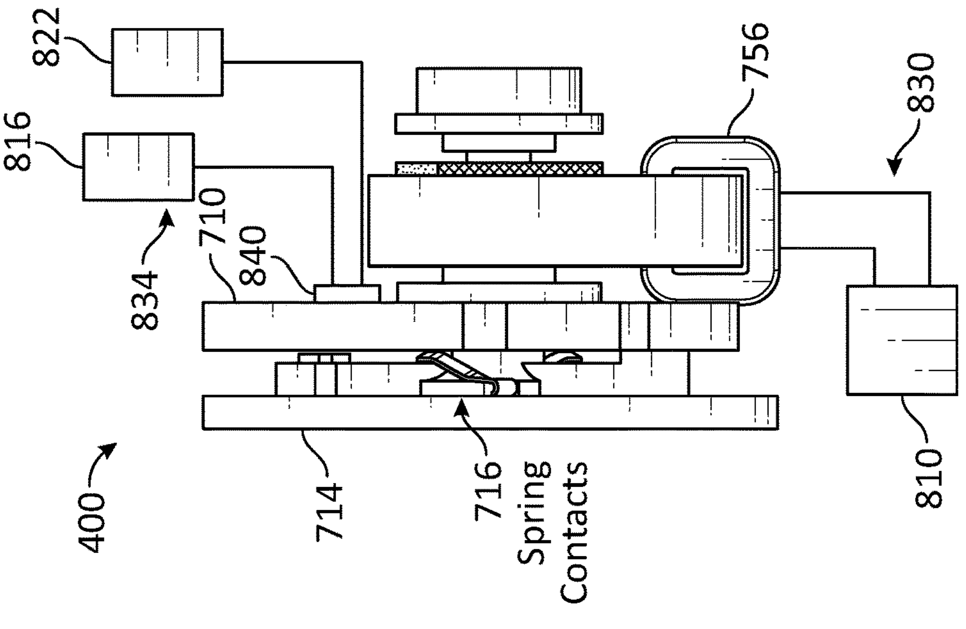
FIG. 8 illustrates a side view of the VSI of FIG. 7 with front and rear covers removed for illustration purposes, in accordance with an embodiment of the disclosure.

FIG. 8 illustrates a side view of VSI 400 with front cover 742 and rear cover 744 removed for illustration purposes, in accordance with an embodiment of the disclosure. Referring to FIG. 8, spring contacts 716 may be held in a compressed state between wheel 714 and circuit board 710 (e.g., by shaft 712). In embodiments, the compression may be sufficient to maintain contact of spring contacts 716 with contact pads 726 over shaft slop and tolerances. As shown, the axial switch and rotary solenoid components may provide a short assembly. For example, the overall assembly may be larger in diameter than length.

With continued reference to FIG. 8, a system may include VSI 400, a controller 810, a power source 816, and a munition 822. Controller 810, which may be controller 112 or another controller or logic device of system 100, may be configured to control operation of bistable rotary solenoid 750. For instance, a first circuit path 830 includes a pair of wires connected to controller 810 and each side of electromagnet coil 756. In such embodiments, controller 810 may provide current/voltage to electromagnet coil 756 in either direction to operate bistable rotary solenoid 750, such as to toggle VSI 400 between positions.

As shown, a second circuit path 834 may include a pair of wires connected to contact pads 726 (e.g., via one or more traces of circuit board 710), with one wire connected between power source 816 and a first contact pad 726 of circuit board 710 and another wire connected between munition 822 and a second contact pad 726 of circuit board 710. In such embodiments, VSI 400 provides a physical switch to pass current/voltage from power source 816 to munition 822. For example, in the powered-on state, spring contacts 716 engage contact pads 726 to complete the circuit between power source 816 and munition 822 (e.g., to arm munition 822). In the powered-off state, spring contacts 716 disengage contact pads 726 to open the circuit between power source 816 and munition 822 (e.g., to disarm munition 822). As shown, the wires of second circuit path 834 may extend through a conduit 840 extending from circuit board 710, although other configurations are contemplated.

Figure 9:
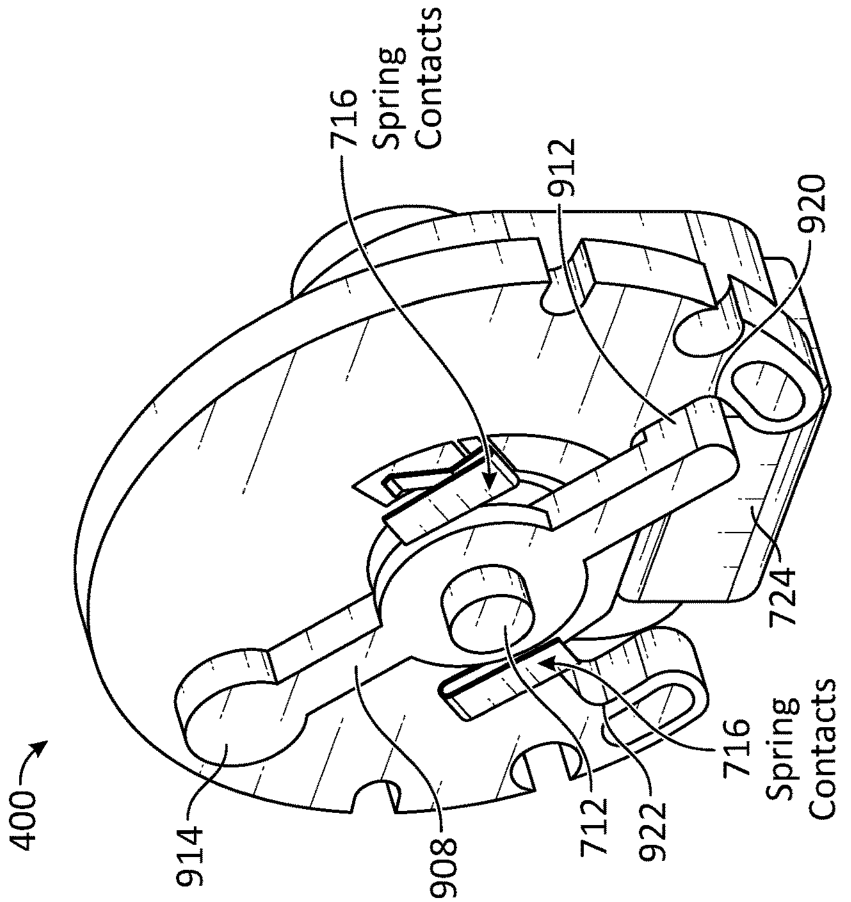
FIG. 9 illustrates a diagram of the VSI of FIG. 8 with a visual indicator wheel additionally removed for illustration purposes, in accordance with an embodiment of the disclosure.

FIG. 9 illustrates a diagram of VSI 400 with front cover 742, rear cover 744, and wheel 714 removed for illustration purposes, in accordance with an embodiment of the disclosure. Referring to FIGS. 7 and 9, VSI 400 may include a rotor arm 908 coupled to rotate with shaft 712. For example, rotor arm 908 may be fixed to shaft 712 and positioned between wheel 714 and circuit board 710. As shown in FIG. 9, rotor arm 908 includes a first end 912 and a second end 914. As shown in FIG. 9, first end 912 may be positioned within cutout 724 of circuit board 710 to engage first and second mechanical stops 920, 922 to define the connected and disconnected positions, respectively. For example, first mechanical stop 920 may be defined by an end of cutout 724, and second mechanical stop 922 may be defined by an opposing end of cutout 724, although other configurations are contemplated. As detailed below, bistable rotary solenoid 750 may be configured to apply a first continuous positive pressure of first end 912 against first mechanical stop 920 in the connected position. In like manner, bistable rotary solenoid 750 may be configured to apply a second continuous positive pressure of first end 912 against second mechanical stop 922 in the disconnected position.

Figure 10:
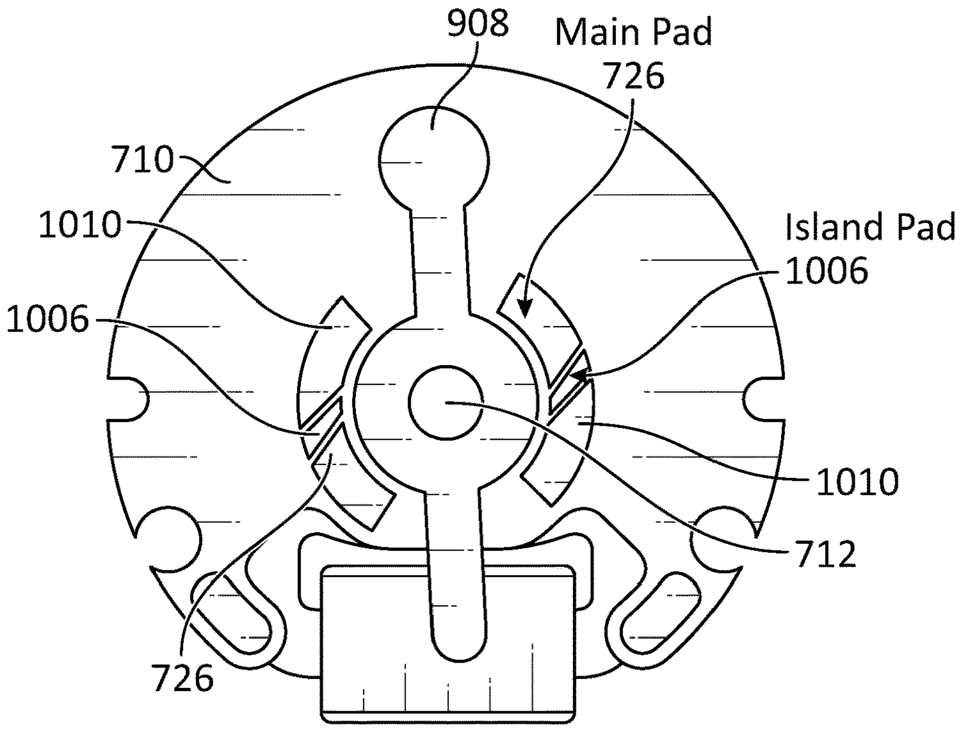
FIG. 10 illustrates a diagram of the VSI of FIG. 9 with a pair of spring contacts additionally removed for illustration purposes, in accordance with an embodiment of the disclosure.

FIG. 10 illustrates a diagram of VSI 400 with front cover 742, rear cover 744, wheel 714, and spring contacts 716 removed for illustration purposes, in accordance with an embodiment of the disclosure. As shown, circuit board 710 may include a pair of secondary contact pads 1006. Similar to contact pads 726, secondary contact pads 1006 may be positioned about thru hole 722, such as diametrically opposed across thru hole 722 and adjacent contact pads 726. In embodiments, circuit board 710 may include a pair of landing pads 1010 positioned adjacent secondary contact pads 1006. Landing pads 1010 may include characteristics similar to contact pads 726 and/or secondary contact pads 1006, such as having a similar coefficient of friction and/or a similar height above circuit board 710, to reduce sliding resistance of spring contacts 716 moving across the various pads. In such embodiments, spring contacts 716 may engage landing pads 1010 in the disconnected position. In this manner, as shaft 712 rotates wheel 714, spring contacts 716 rotate on contact pads 726, secondary contact pads 1006, and landing pads 1010 between the connected and disconnected positions.

Secondary contact pads 1006 may be positioned such that spring contacts 716 engage secondary contact pads 1006 prior to engaging contact pads 726 when moving from the disconnected position to the connected position. In embodiments, secondary contact pads 1006 may be connected to contact pads 726 through a high value resistor. In addition, contact pads 726 and secondary contact pads 1006 may have an angled split and island feature. In this manner, a "soft" electrical connection may occur when moving spring contacts 716 from the disconnected position to the connected position, such as to reduce arcing. These features may also facilitate reduced contact sliding resistance when spring contacts 716 move from the disconnected position to the connected position, and vice versa.

Figure 11:
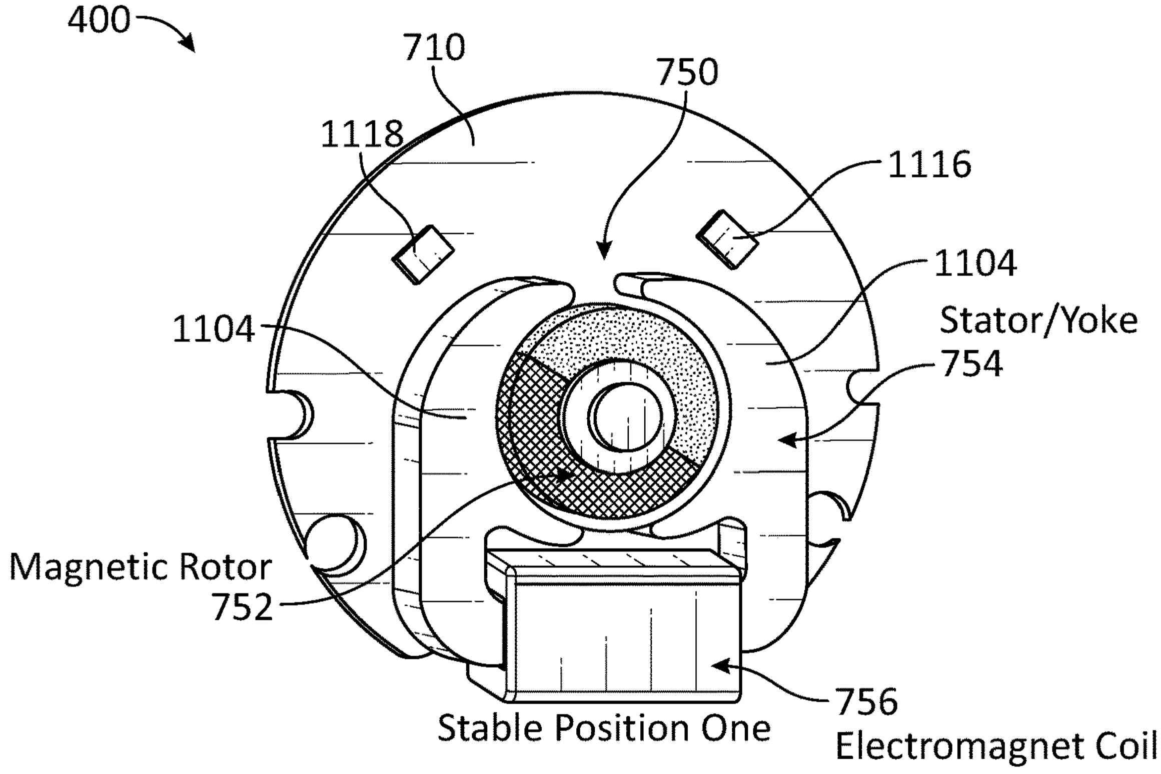
FIG. 11 illustrates a diagram of the VSI of FIG. 7 in a first position and with portions removed for illustration purposes, in accordance with an embodiment of the disclosure.
Figure 12:
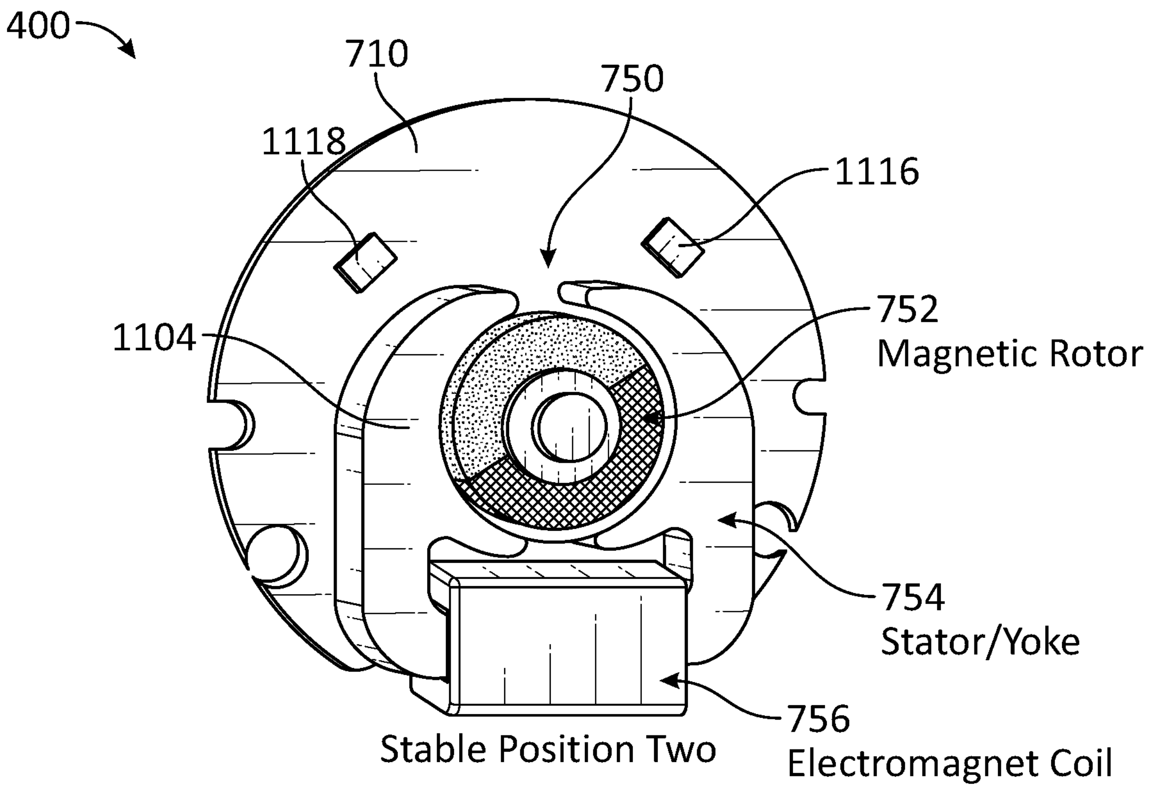
FIG. 12 illustrates a diagram of the VSI of FIG. 7 in a second position and with portions removed for illustration purposes, in accordance with an embodiment of the disclosure.

FIG. 11 illustrates a diagram of VSI 400 with bistable rotary solenoid 750 in a first position, in accordance with an embodiment of the disclosure. FIG. 12 illustrates a diagram of VSI 400 with bistable rotary solenoid 750 in a second position, in accordance with an embodiment of the disclosure. Rotor 752 may be a diametrically magnetized ring magnet coupled to shaft 712 and held concentric within stator 754 (e.g., with stator slots 1104). Stator slots 1104 may be connected to electromagnet coil 756 to define a flux path that controls movement of rotor 752.

In embodiments, the flux path design is highly salient such that the magnet poles of rotor 752 want to align horizontally with stator 754 even without power. First and second mechanical stops 920, 922, however, may limit full alignment in either direction, thereby creating two stable positions (FIG. 11 and FIG. 12) with continuous positive pressure against the stops. In such embodiments, rotor 752 may be toggled between the two positions by reversing the current in electromagnet coil 756. For example, reversing the current in electromagnet coil 756 may reverse the polarity of stator slots 1104, overcoming the passive detent force and attracting the magnet poles of rotor 752 to the opposite side.

In embodiments, VSI 400 may report the position of the switch. For example, referring to FIG. 7, a magnet 1110 may be disposed in second end 914 of rotor arm 908 to move with wheel 714/shaft 712. Referring to FIGS. 11-12, at least one hall effect sensor (e.g., a first hall effect sensor 1116 and a second hall effect sensor 1118) may be coupled to circuit board 710. In such embodiments, magnet 1110 may align with a hall effect sensor in the respective connected position/powered-on state or disconnected position/powered-off state. For example, magnet 1110 may align with first hall effect sensor 1116 in the connected position or power-on state of VSI 400. In like manner, magnet 1110 may align with second hall effect sensor 1118 in the disconnected position or powered-off state of VSI 400. Two separate hall effect sensors may provide redundancy, positive confirmation, and error reporting (e.g., rotor 752 stuck in-between positions). Such embodiments are illustrative only, and VSI 400 may include other configurations to report the position of the switch.

Figure 13:
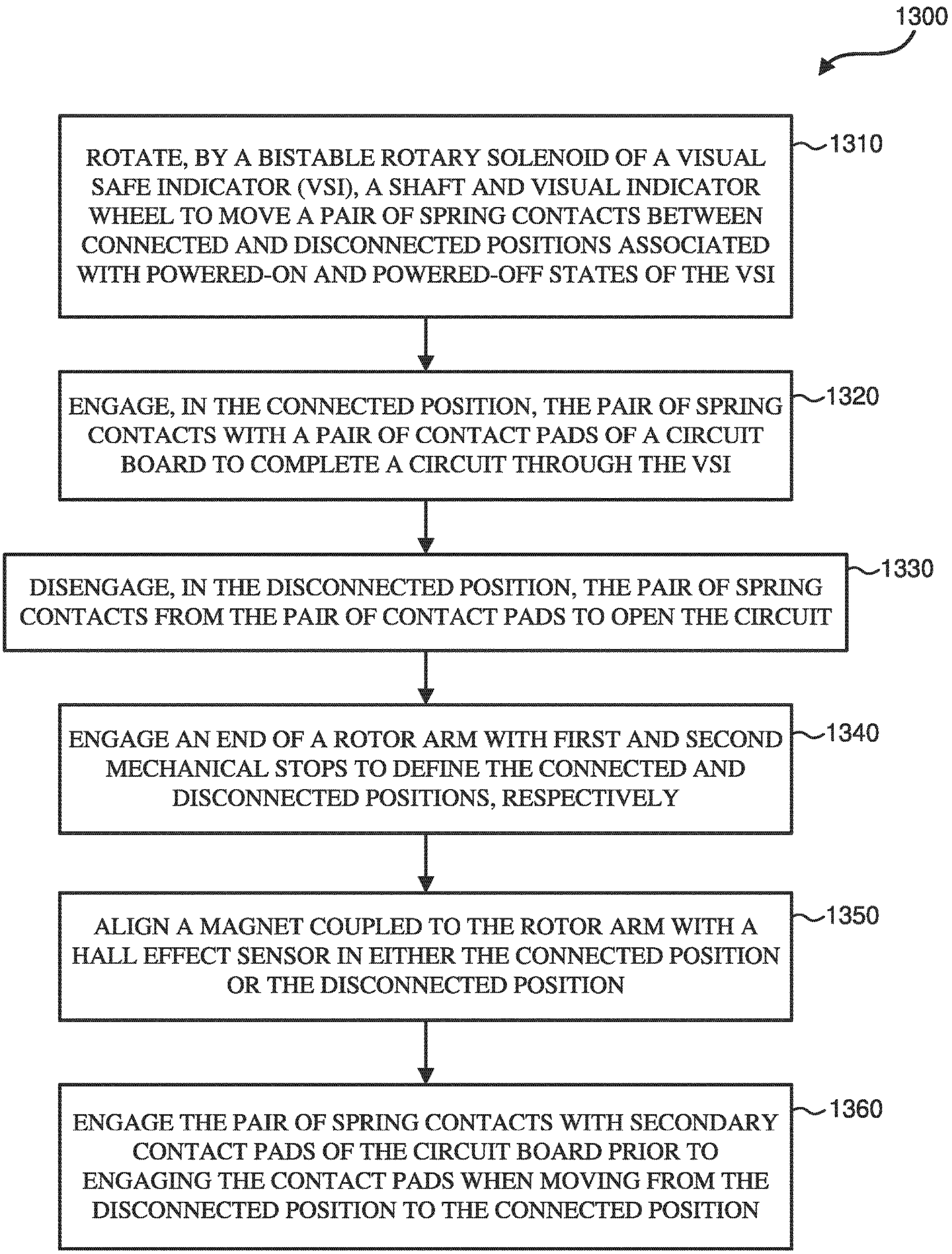
FIG. 13 illustrates a process of moving a VSI between powered-on and powered-off states, in accordance with an embodiment of the disclosure.

FIG. 13 illustrates a process 1300 of moving a VSI between powered-on and powered-off states, in accordance with an embodiment of the disclosure. Although described with reference to VSI 400 illustrated in FIGS. 4-12, process 1300 may be used in connection with other embodiments. Note that one or more operations of FIG. 13 may be combined, omitted, and/or performed in a different order as desired.

In block 1310, process 1300 includes rotating, by bistable rotary solenoid 750, shaft 712 and wheel 714 to move spring contacts 716 between the connected and disconnected positions associated with the powered-on and powered-of states of VSI 400. For example, bistable rotary solenoid 750 may toggle rotor 752 between positions, thereby rotating shaft 712 and wheel 714 to move spring contacts 716 between their connected and disconnected positions.

In block 1320, process 1300 includes engaging, in the connected position, spring contacts 716 with contact pads 726 of circuit board 710 to complete a circuit through VSI 400, such as in a manner as described above. In block 1330, process 1300 includes disengaging, in the disconnected position, spring contacts 716 from contact pads 726 to open the circuit, such as in a manner as described above.

In block 1340, process 1300 includes engaging an end of rotor arm 908 with first and second mechanical stops 920, 922 to define the connected and disconnected positions, respectively. Block 1340 may include applying, by bistable rotary solenoid 750, a first continuous positive pressure of first end 912 against first mechanical stop 920 in the connected position. Block 1340 may include applying, by bistable rotary solenoid 750, a second continuous positive pressure of first end 912 against second mechanical stop 922 in the disconnected position.

In block 1350, process 1300 includes aligning magnet 1110 with a hall effect sensor in either the connected position or the disconnected position. For example, block 1350 may align magnet 1110 with first hall effect sensor 1116 in the connected position. Additionally, or alternatively, block 1350 may align magnet 1110 with second hall effect sensor 1118 in the disconnected position.

Although the position of rotor 752 has been discussed as being detected using hall effect sensors 1116 and 1118, other position detection techniques are contemplated. In some embodiments, one or more additional pairs of spring contacts may be provided instead of or in addition to hall effect sensors 1116 and 1118 to detect the position of rotor 752. For example, the additional spring contacts may selectively pass one or more associated signals (e.g., 5V signals) provided by controller 810 when rotor 752 is oriented in one or more associated positions.

In block 1360, process 1300 includes engaging spring contacts 716 with secondary contact pads 1006 of circuit board 710 prior to engaging contact pads 726 when moving from the disconnected position to the connected position, such as in a manner as described above.

Although various VSI embodiments disclosed herein have been discussed in relation to UAVs, additional embodiments are contemplated such as VSI implementations with missiles, land mines, and other conventional munitions, any of which that may or may not include UAVs.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

The foregoing description is not intended to limit the present disclosure to the precise forms or particular fields of use disclosed. Embodiments described above illustrate but do not limit the invention. It is contemplated that various alternate embodiments and/or modifications to the present invention, whether explicitly described or implied herein, are possible in light of the disclosure. Accordingly, the scope of the invention is defined only by the following claims.

What is claimed is:

1. A visual safe indicator (VSI) comprising:
a circuit board comprising a pair of contact pads;
a shaft configured to rotate about an axis;
a visual indicator wheel coupled to rotate with the shaft; and
a pair of spring contacts coupled to the visual indicator wheel,
wherein rotation of the shaft rotates the visual indicator wheel to move the pair of spring contacts between connected and disconnected positions associated with powered-on and powered-off states of the VSI, the connected position engaging the pair of spring contacts with the pair of contact pads to complete a circuit through the VSI, the disconnected position disengaging the pair of spring contacts from the pair of contact pads to open the circuit.

2. The VSI of claim 1, wherein:
the pair of spring contacts are held in a compressed state between the visual indicator wheel and the circuit board; and
the visual indicator wheel comprises a trace between the pair of spring contacts.

3. The VSI of claim 1, further comprising a bistable rotary solenoid to rotate the shaft between the connected and disconnected positions.

4. The VSI of claim 3, further comprising a rotor arm coupled to rotate with the shaft, the rotor arm comprising an end configured to engage first and second mechanical stops to define the connected and disconnected positions, respectively.

5. The VSI of claim 4, wherein the bistable rotary solenoid is configured to:
apply a first continuous positive pressure of the end against the first mechanical stop in the connected position; and
apply a second continuous positive pressure of the end against the second mechanical stop in the disconnected position.

6. The VSI of claim 4, further comprising:
a hall effect sensor coupled to the circuit board; and
a magnet coupled to the rotor arm to align with the hall effect sensor in either the connected position or the disconnected position.

7. The VSI of claim 1, wherein the circuit board comprises a pair of secondary contact pads positioned such that the spring contacts engage the secondary contact pads prior to engaging the contact pads when moving from the disconnected position to the connected position.

8. An unmanned aerial vehicle comprising the VSI of claim 1.

9. A system comprising:
an unmanned aerial vehicle (UAV); and
a visual safe indicator (VSI) integrated into the UAV, the VSI comprising:
a circuit board comprising a pair of contact pads,
a shaft configured to rotate about an axis,
a visual indicator wheel coupled to rotate with the shaft, and
a pair of spring contacts coupled to the visual indicator wheel,
wherein rotation of the shaft rotates the visual indicator wheel to move the pair of spring contacts between connected and disconnected positions associated with powered-on and powered-off states of the VSI, the connected position engaging the pair of spring contacts with the pair of contact pads to complete a circuit through the VSI, the disconnected position disengaging the pair of spring contacts from the pair of contact pads to open the circuit.

10. The system of claim 9, wherein:
the pair of spring contacts are held in a compressed state between the visual indicator wheel and the circuit board; and
the visual indicator wheel comprises a trace between the pair of spring contacts.

11. The system of claim 9, further comprising:
a bistable rotary solenoid to rotate the shaft between the connected and disconnected positions; and
a rotor arm coupled to rotate with the shaft, the rotor arm comprising an end configured to engage first and second mechanical stops to define the connected and disconnected positions, respectively.

12. The system of claim 11, wherein the bistable rotary solenoid is configured to:
apply a first continuous positive pressure of the end against the first mechanical stop in the connected position; and
apply a second continuous positive pressure of the end against the second mechanical stop in the disconnected position.

13. The system of claim 11, further comprising:
a hall effect sensor coupled to the circuit board; and
a magnet coupled to the rotor arm to align with the hall effect sensor in either the connected position or the disconnected position.

14. The system of claim 9, wherein the circuit board comprises a pair of secondary contact pads positioned such that the spring contacts engage the secondary contact pads prior to engaging the contact pads when moving from the disconnected position to the connected position.

15. A method comprising:
rotating, by a bistable rotary solenoid of a visual safe indicator (VSI), a shaft and visual indicator wheel to move a pair of spring contacts between connected and disconnected positions associated with powered-on and powered-off states of the VSI, wherein the spring contacts are coupled to the visual indicator wheel;
engaging, in the connected position, the pair of spring contacts with a pair of contact pads of a circuit board to complete a circuit through the VSI; and
disengaging, in the disconnected position, the pair of spring contacts from the pair of contact pads to open the circuit.

16. The method of claim 15, further comprising engaging an end of a rotor arm with first and second mechanical stops to define the connected and disconnected positions, respectively, wherein the rotor arm is coupled to rotate with the shaft.

17. The method of claim 16, wherein the engaging the end of the rotor arm with the first and second mechanical stops comprises:

applying, by the bistable rotary solenoid, a first continuous positive pressure of the end against the first mechanical stop in the connected position; and applying, by the bistable rotary solenoid, a second continuous positive pressure of the end against the second mechanical stop in the disconnected position.

18. The method of claim 16, further comprising aligning a magnet coupled to the rotor arm with a hall effect sensor in either the connected position or the disconnected position, wherein the hall effect sensor is coupled to the circuit board.

19. The method of claim 15, further comprising engaging the pair of spring contacts with secondary contact pads of the circuit board prior to engaging the contact pads when moving from the disconnected position to the connected position.

20. The method of claim 15, wherein:

the pair of spring contacts are held in a compressed state between the visual indicator wheel and the circuit board; and the visual indicator wheel comprises a trace between the pair of spring contacts.

* * * * *